(12) United States Patent
Bernath et al.

(10) Patent No.: US 8,686,371 B1
(45) Date of Patent: Apr. 1, 2014

(54) USING OF ENHANCED RETROREFLECTORS FOR NON-VISIBLE LIGHT

(75) Inventors: Robert Bernath, Orlando, FL (US); Richard Stoltz, Plano, TX (US); Jeff Bullington, Chuluota, FL (US)

(73) Assignee: Tia Systems, Inc., Chuluota, FL (US)

( * ) Notice: Subject to any disclaimer, the term of this patent is extended or adjusted under 35 U.S.C. 154(b) by 231 days.

(21) Appl. No.: 13/228,273

(22) Filed: Sep. 8, 2011

Related U.S. Application Data

(60) Provisional application No. 61/385,356, filed on Sep. 22, 2010.

(51) Int. Cl.
*G01J 1/42* (2006.01)
(52) U.S. Cl.
USPC .......................................... 250/393
(58) Field of Classification Search
USPC .......................................... 250/393
See application file for complete search history.

(56) References Cited

U.S. PATENT DOCUMENTS

| | | | |
|---|---|---|---|
| 3,867,302 A | 2/1975 | Takano et al. | |
| 5,100,580 A | 3/1992 | Powell et al. | |
| 8,329,061 B2 * | 12/2012 | Jia | 252/301.4 H |
| 2003/0016368 A1 | 1/2003 | Aman et al. | |
| 2009/0010644 A1 * | 1/2009 | Varshneya et al. | 398/33 |
| 2011/0170193 A1 * | 7/2011 | Budd et al. | 359/518 |

* cited by examiner

*Primary Examiner* — David Porta
*Assistant Examiner* — Hugh Maupin
(74) *Attorney, Agent, or Firm* — Daniel J. Chalekr; Chainey P. Singleton; Chalker Flores, LLP

(57) ABSTRACT

This is a way interrogating an object using retro-reflection of non-visible light. It uses e.g. IR transmitted toward the object from a distance and covertly detects the retro-reflection. Highly reflective passive non-visible light retroreflectors on the object reflects and refracts light back toward the light transmitter, with the returned light being very nearly parallel to the light from a narrow beam light transmitter.

20 Claims, 2 Drawing Sheets

USING OF ENHANCED RETROREFLECTORS FOR NON-VISIBLE LIGHT

CROSS-REFERENCE TO RELATED APPLICATIONS

This application claims priority to U.S. Provisional Application Ser. No. 61/385,356, filed Sep. 22, 2010, the contents of which is incorporated by reference herein in its entirety.

TECHNICAL FIELD OF THE INVENTION

The present invention relates in general to the field of interrogating an object using retro-reflection of non-visible light, and in particular, an apparatus and method in which IR is transmitted toward the object from a distance and covertly detects the retro-reflection.

BACKGROUND OF THE INVENTION

A retro-reflector is a device that sends light or other radiation back towards the direction it came from regardless of the angle of incidence, unlike a mirror, which does that only if the mirror is exactly perpendicular to the light beam. This effect can be commonly obtained in two ways: with a series of three perpendicular mirrors (a corner reflector), a sphere of material with refractive index different from the surrounding media and/or other properly designed geometries.

Retro-reflection is used on road surfaces, road signs, vehicles and clothing (large parts of the surface of special safety clothing, less on regular coats). When lights illuminate a retro-reflective surface, the reflected light is directed generally towards the source, and not highly wasted by going in all directions as with diffuse reflection. Retroreflectors can approach efficiencies greater than 60%. Corner reflectors are better at sending the light back to the source over long distances, while spheres are better at sending the light to a receiver somewhat off-axis from the source.

In 1942, Engineering News—Record wrote, "Paint surfaced with reflective beads has been found superior to any other type painted pavement marking Five hundred miles of this type have been laid in Philadelphia and found to be very satisfactory. Although glass-beaded paint costs more, experience shows that it wears four to five times as long." When reflectorized paint was first introduced, the greater durability of the paint line made the reflectorized paint more cost effective. Today, reflectors are used on center and edge lines for greater safety.

FIGS. 1 and 2 illustrate the difference between using pavement markings with and without reflective beads. FIG. 1 shows prior art pavement markings with uncoated retro-reflective beads at night when illuminated with visible light from automobile headlights. FIG. 2 shows prior art pavement markings without reflective beads at night when illuminated with visible light from automobile headlights. By comparing FIGS. 1 with 2, it can be seen that the use of even uncoated reflective beads makes a dramatic difference. The two center lines here reflected yellow light, as the uncoated beads were embedded in yellow paint. Up to 80% of the signal can be reflected back to source with a 60° from normal acceptance angle.

Unbeaded paint lines will reflect light randomly in all directions. When round reflective beads are added, light is reflected and directed toward the source of the light.

Hence, a retro-reflector is a device that sends light or other radiation back where it came from regardless of the angle of incidence, unlike a mirror, which does that only if the mirror is exactly perpendicular to the light beam. This effect can be commonly obtained in two ways: with a set of three perpendicular mirrors (a corner reflector) and with a transparent sphere of material with refractive index. A retro-reflector may consist of many very small versions of these structures incorporated in a thin sheet or in paint. In the case of paint containing glass beads, the paint glues the beads to the surface where retro-reflection is required, and the structure protrude, about twice the thickness of the paint. A third, much less common way of producing a retro-reflector is to use the nonlinear optical phenomenon of phase conjugation. This technique is used in advanced optical systems such as high-power lasers and optical transmission lines.

When light strikes a non-corner reflector retro-reflector it is refracted and reflected. Refraction is the bending of the light. Refraction is observed when a pencil is dropped into a half filled glass of water; the pencil appears bent. Reflective retro-reflector's ability to bend light is measured by its index of refraction, which is a ratio of the sine of the angle of incidence to that of the refraction. The retro-reflectivity of glass beads is better explained by examining the path of light as it enters a single retro-reflector in the paint (FIG. 3). There are actually millions of tiny retro-reflector in each delivery element that perform this principle.

As the laser beam enters the retroreflector, it is bent or refracted. This beam then shines on the back surface of the retroreflector, which is on top of the paint, thermoplastic, etc. The paint works a lot like a mirror. If the paint were not present, most of the light would continue through the bead and bounce in several directions. This is one reason why the retroreflectors are often placed in a polypropylene paint up to one half of the retroreflector. The light is bent (refracted) by the curved surface of the retro-reflector to a point below where the retro-reflector is sunk into the paint. Thus, when light is reflected off the paint at the back of the reflectors a large portion of that light is reflected through the retro-reflector and refracted back toward the light transmitter.

The amount of refraction of light is characteristic of the glass itself and is known as the index or refraction (n) of the glass, bead, particle, or phosphor. The refractive index of the retro-reflector is dependent upon the chemical and physical make-up of the glass material. Various types of retroreflectors have different indices of refraction and cause different amounts of light to be retro-reflection or returned to the receiver/laser transmitter.

Water has an index of refraction of 33, while the typical bead made with soda glass has a refractive index of 1.50. Beads used in the pavement marking industry are available in refractive indexes of 1.50, 1.65 and 1.90. The durability of the glass with an index of refraction of 1.9 is not as good as the soda glass retroreflector. Retroreflectors with a refractive index of 1.90 are generally called, "airport beads," and are used to mark runways at airports.

Retro reflectivity is dependent upon the immersion level on the bead, particle, or phosphor. Optimum level of retro-reflector beads is 50-60%, assuring optimum imaging. Increasing immersion beyond 60% significantly decreases the amount of light that can be directed back to the receiver/laser. Typically this coating is obtained when the bead is set into a paint or polymer.

The problem of cargo security is global. Some reported numbers include:
   Airport/Port Security
   9,618,337 departed flights in a recent year
   63,800 Cargo ship port calls in 2007
   Cargo Containers $12.5 Trillion of cargo is moved each year in ~200 million containers Globally, 2% are inspected Nearly $50 billion a year is lost to high-value cargo theft Border Control 41,694,587 pedestrians crossed US borders in a recent year 6,626,007 loaded truck containers 194,525,561 passengers in personal vehicles Illegal immigrants are estimated at 12 million, almost 1 in every 20 workers. 26 tunnels in 2009, 16 in 2008 with a 60% increase in tunneling Product Counterfeiting The overall cost of counterfeiting in the world was about 5-7% of world trade (some estimates put this at $176-250 billion)

SUMMARY OF THE INVENTION

This can be a method of interrogating an object using retro-reflection of non-visible light. It uses e.g. IR transmitted toward the object from a distance and covertly detects the retro-reflection. Highly reflective passive non-visible light retro-reflectors can be used on the object to reflect and refract light back toward the light transmitter, with the returned light being very nearly parallel to the light from a narrow beam light transmitter.

This can use enhanced performance retroreflectors covertly interrogated with non-visible light, with retroreflectors that resemble common non-obvious media in the visible spectra.

The use of non-visible light, preferably interrogated at a non-perpendicular angle (to generally avoid reflection off of other reflective surfaces), and reflectors that are small and do not retro-reflect visible light allows both the existence of a tag and the interrogation of the tag to be covert.

This can also be a method of identifying an object with non-visible light from a remote location, comprising: illuminating said object from said remote location with non-visible light having a predetermined wavelength band; sensing for non-visible light from said object, wherein said sensing is at said remote location; and determining if said object has a passive non-visible light retro-reflector on its surface, wherein said determining is at said remote location.

The Illuminating non-visible light is preferably infrared and eye-safe, e.g. 1550 nm. The passive retro-reflector preferably has a hemispherical reflective coating.

This can also be a method of identifying at least two objects with non-visible light from a remote location, comprising: illuminating said at least two objects with non-visible light from a remote location; sensing non-visible light emanating from said objects at said remote location; and analyzing said non-visible light emanating from said objects to determine if any of said non-visible light has been reflected by a passive non-visible light retro-reflector, whereby objects having retroreflectors can be distinguished from objects not having retroreflectors at said remote location.

This can also be a method of determining from a remote location if said object has a passive non-visible light retro-reflector on its surface, comprising: Illuminating said object with non-visible light having a predetermined wavelength from a remote location; and Sensing at said remote location for non-visible light reflected from a passive retroreflector.

The passive retro-reflector may be of chalcogenide glass, silicon, tellurium-containing glass, or selenium-containing glass. The passive retro-reflector may be spherical. The passive retro-reflector may be amorphous.

The passive retro-reflector may be less than 1 mm in diameter. The passive retro-reflector may be less than 50 microns in diameter. The passive retro-reflector may be even less than 10 microns in diameter. The passive retro-reflector may be between 3 and 10 microns in diameter.

The passive retro-reflector may contain a phosphor or other non-linear optical material. This can use a spheroid retro-reflector which is not highly reflective of visible light. The retro-reflector can be designed for reflectivity outside of the visible spectra of radiation. The retro-reflector element can be of a design where half of the element may be coated with a reflective coating by use of an additive deposition method based on an electroforming technology. The inner portion of the retro-reflector element is at least partially transparent to the interrogating light.

An outer layer of material can be applied uniformly around the retroreflective element. The coated retroreflective element can have a dull appearance in visible spectra and be transparent in the infra red spectra. Once such coating is silicon. For long range interrogation a coherent light source is preferable. As used herein, the term "spheres", includes oblate spheroids, prolate spheroids, as well as spheres.

This can also be a method of producing a selective light interrogatible retro-reflector sphere, said method comprising: providing a spherical retro-reflector inner portion at least partially transparent to interrogating light; and depositing an outer layer of material over said inner portion, wherein said material substantially scatters or absorbs visible light and at least partially transmits said interrogating light.

In some embodiments, the outer layer of material is chalcogenide glass, silicon, or selenium glass. In some embodiments, the interrogating light is infrared and preferably eye-safe. Preferably, the retro-reflector is preferably passive, has a hemispherical reflective coating. In some embodiments, the passive retro-reflector contains a phosphor.

Preferably, the retro-reflector is less than 1 mm in diameter, more preferably less than 50 microns in diameter, and even more preferably passive retro-reflector is less than 10 microns and more than 3 microns in diameter.

BRIEF DESCRIPTION OF THE DRAWINGS

The invention can be better understood with reference to the figures, in which.

DETAILED DESCRIPTION OF THE INVENTION

Figure 1:
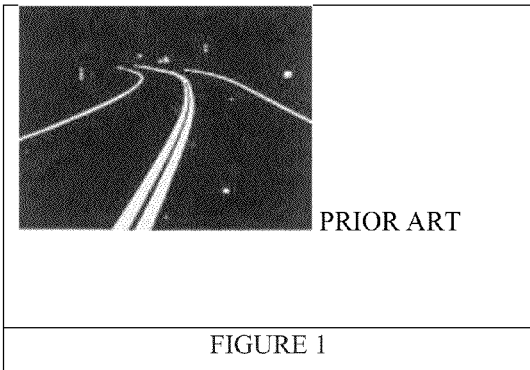
FIG. 1 shows prior art pavement markings with reflective beads at night when illuminated with visible light from automobile headlights.
Figure 2:
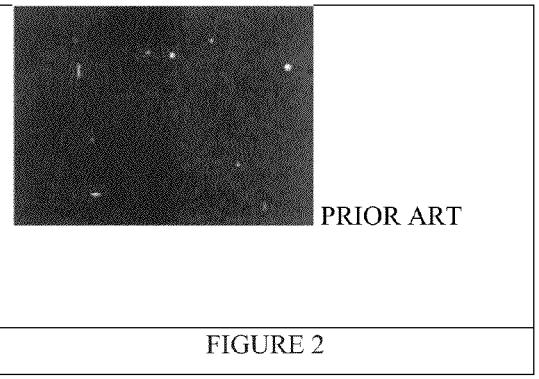
FIG. 2 shows prior art pavement markings without reflective beads at night when illuminated with visible light from automobile headlights.

Cargo containers are generally inspected and sealed prior to shipping. If the seal is in place and the container does not appear to be damaged. Then the containers are generally not re-inspected until arrival at their final destination unless the container appears damaged.

Modern smugglers and thieves, however, have cut the doors of the containers, welded them, and then repainted them to avoid tampering with the seal. Placing the bead-containing paint tag in the original paint of the cargo containers allows easy detection of where smugglers or thieves have covered the welds or other damaged regions of the cargo container with conventional paint.

Placing the bead-containing paint tag in the original paint of the cargo containers allows easy detection of where smugglers or thieves have covered the welds or other damaged regions of the cargo container with conventional paint.

Commercial cargo-containers, including vehicles, can be painted with paint caring tags as such any modification or substitution of them can be easily detected.

Single or multiple tags, in one or more various locations, patterned and/or unpatterned, painted directly on a container and/or on items attached to the container, can be used. Thus, for example, the retro-reflector tags can be used, e.g. painted, on the security-seals of cargo doors of rail-cars, ships, or trucks and on containers in their cargo, and these tags can be detected while the vehicles or cargo are in motion. The inquiry of tags can be with eye-safe IR and thus without harming personnel in the interrogation beam.

As the beads are not easily seen in visible light, they are difficult to counterfeit. Even in the smugglers or thieves know the beads are there, it is difficult to get the same bead content as in the original paint. Thus a medium density of beads is generally preferred.

Beads can be used over at least of a portion of a label and/or a security seal, and/or at least a portion of the container. In some embodiments, tape used to seal boxes can be use as a security seal. The beads can be applied as a barcode, as covert barcoded labeling of containers can add an extra level of security. Products exist that have printing or bar codes and tape that cannot be resealed. However, there are no current products that provide easily detection of tampering or counterfeiting.

Tampering can be detected using these beads to determine, e.g., if a container has been redirected, and/or if something has been removed and/or inserted in the container.

If missing containers are found later in some other location, beads can provide evidence that the containers had been stolen. Tagging on six faces of a box can make the stolen box easier to find.

This is a method of interrogating an object to using in high efficiency retro-reflection of non-visible light. It uses the, e.g. IR, transmitted toward the object from a distance and covertly retro-reflect it. Highly reflective passive non-visible light retroreflectors used by this method reflect and refract light back toward the interrogating light transmitter, with the returned light being very nearly parallel to the light from a narrow beam light transmitter.

As used herein the terms "bead" or "beads" refer to—retro-reflector bead—or—retro-reflector beads—, unless otherwise indicated. In addition, the terms "bead" or "beads" us used herein include spheres and distorted spheres; ellipsoids, spheroids (probate and oblate), ovoids, and including distortions, thereof. Preferably spheres or nearly spherical beads are used.

Generally, the covert bead retroreflectors have hemispherical reflective coatings. Interrogation of beads may be performed using a coherent laser light source (e.g. eye-safe 1,550 nm). Interrogation of beads may be performed using low power, e.g. <0.5 W for shorter range finder source e for near field detection. A higher power, e.g. 5 W, laser source can be used for far field, long range detection.

The bead content of liquid paint before being painted, as compared to the normal bead content in commercially used reflectorized paint, can be varied from relatively low, up to commercially used content. Use of varying content can make counterfeiting more difficult, as, e.g., matching the bead density on a counterfeit security seal to the bead density on the original container is not easy.

Beads may be applied through one or more stencils to give the beads a distinctive pattern. Spotted or textured retro-reflections over an area are generally preferred in most embodiments as being less expensive and more covert. Spotted or textured retro-reflections over an area utilize fewer beads.

In some embodiments, there can be a mix of IR and/or UV (preferably IR) protected and unprotected containers. The protected containers may be further near-range examined if there are indications of tampering.

Protected containers preferably have covert retro-reflective beads and/or covert retro-reflective with half-coated IR/UV reflectors. In some embodiments, an IR/UV marking is applied over at least a portion of a label and at least a portion of the container.

In some embodiments, a covert barcode is used to verify a visible barcode; e.g. the covert barcode can match or be a mathematical function of the visible barcode.

Covert retro-reflecting beads and mixtures of different types of beads can be used. A mixture of retro-reflecting bead types can include, e.g., coated retro-reflecting UV and/or IR beads; with or without UV and/or IR phosphors; areas with some plain-glass beads and areas with both plain-glass and half reflective coated beads, more than two types of beads, and other mixtures of bead types.

Customized retro-reflecting bead types and patterns can be used by different shippers to help in sorting containers and to confuse criminals. Rejection of tampered packages at stages, e.g. both incoming and outgoing, can be used to localize where tampering had occurred.

Loose beads inside of container to indicate who may have opened the container, e.g. with IR phosphor [catch them (infra)-red handed]. This could be done with bait containers to help trapping of thieves.

Note that unlike highway paint of FIG. 1 where plain glass spheres appear as solid, these retro-reflecting bead loadings reflections in many embodiments preferably appear to be a number of individual dots; just has to be enough beads to look suspicious when tampering has occurred.

Retro-reflecting beads applied to surface can also be, e.g. dusted on and covered with clear tape; printed on, e.g. address label, security seal, or barcode, e.g. with bead-containing ink.

This general approach makes detection of covert beads and counterfeiting difficult for thieves and smugglers, as it can require special equipment, and be time-consuming and more risky.

Coated beads or retro-reflectors can include beads or retro-reflectors with covert, half-reflective, and phosphor-containing coatings, and combinations thereof.

As used herein, "bead" or "beads" mean retro-reflector or retro-reflectors which are reflective of IR/UV light and/or of light from a phosphor activated by IR/UV light unless otherwise indicated.

Retro-reflectors reflect undiffused light back toward the source of light, while clear layers only reflect undiffused light back toward the source when the source is near perpendicular to the surface.

Coated retro-reflectors can be applied with clear binders, e.g. ink, paint, and/or tape. These are preferably interrogated with IR/UV from a non-vertical angle, e.g. and angle of 30 to 60 degrees from vertical.

Diffused IR/UV light reflected off the substrate to which the coated retro-reflectors are applied can make interrogation more difficult, but can be reduced by an IR/UV light absorbing substrate. If the beads have only a covert coating, the amount of retro-reflection depends on the difference of index of refraction between the bead and the binder, and thus covert coatings with at least one of half-reflective and phosphor-containing coatings, are preferred.

As the light is focused to the back of the spherical retro reflector the peak power density increase and the efficiency/brightness of the non linear media/phosphor in the sphere or on the surface of the sphere will increase dramatically.

In some embodiments, the beads are dusted on and then covered, e.g. with a spray of clear paint or with clear tape. Glue may be applied, e.g. in a pattern, to a substrate (e.g. printed, through a stencil, or with a glue stick), and the beads dusted over the glue. The beads may also be dusted over the glue side of clear tape, with or without a pattern and then the tape applied to a substrate.

The non-visible light used in interrogating the bead may be UV and/or IR. Infra red is preferred for many embodiments. Ultraviolet can be used to allow the use of a large number of narrow-band-emitting phosphors, whose retro-reflections can be distinguished from one another.

This includes a security tag of a proprietary coating layer containing small particles, preferably spherical beads and preferably sprayed and/or painted on; and also interrogation of the beads. Beads that are painted-on from a liquid or sprayed typically are just a random pattern of beads within the painted area.

This security tag can include a bead design with a bead coating that can make beads look like dust or dirt to the eye; this combined with the limited viewing angle for the non-visible, e.g. IR, retro reflection signal can make counterfeiting of tags very difficult.

Multiple combinations of multiple different-property security tags can add to the difficulty of counterfeiting, and even finding any or all of the tags. Depending on the value of the cargo, the tagging can be varied from one inexpensive single tag to multiple combinations of multiple different-property tags.

Beads can be produced in high volume e.g. by liquid-phase depositions, e.g. half-reflectors in a 4 step process.

Figure 3:
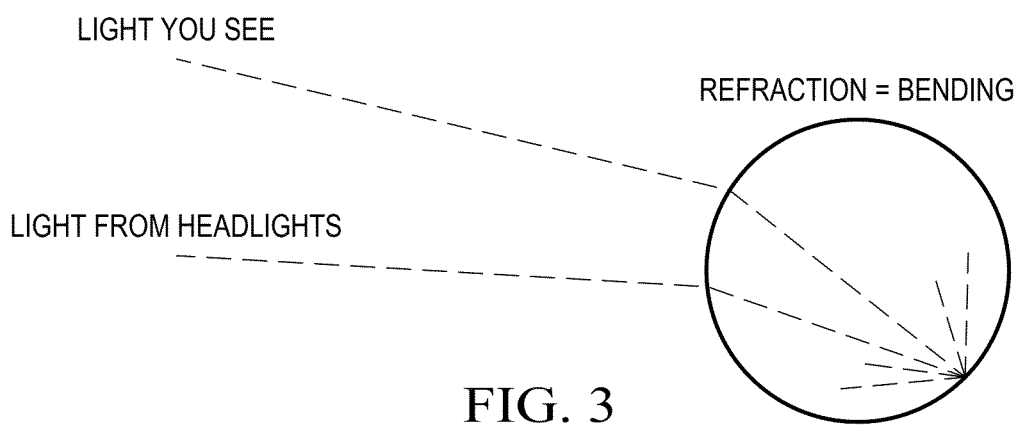
FIG. 3 shows prior art with one ray of light being retro-reflected by a spherical particle.

FIG. 3 shows one ray of visible light being retro-reflected by a spherical bead as has been done in the past, but this FIGURE can be also be used better understand retro-reflected IR and/or UV light and (half-coated with an IR and/or UV reflector) used in accordance with the method herein.

If the bead has a coating as described herein, to block visible light but is not half-coated with an IR and/or UV reflector, the retro-reflection can be much less, depending on the IR and/or UV reflectivity of the paint, but even with black paint can still be about 4% and can be detected.

FIG. 3 can also help explain the focusing of light on the backside of a sphere as used herein. If both of two rays of light shown are incoming light from an interrogation lamp that is larger in diameter than the bead, as is normally the case, both incoming rays converge on a small spot, increasing the intensity. Basically the image of an IR, visible, or UV light source can be focused on the back side of a bead and the energy can be concentrated in a small area of high intensity.

Thus phosphors and other non-linear optical material can be efficiently energized. Phosphors and other non-linear optical material can change the wavelength such that the wavelength of at least a portion of the retro-reflected light is different from that of the interrogating light.

As can also be seen from FIG. 3, the rays are converging within the bead, and thus the area is decreasing and the intensity is rising. Thus phosphors and other non-linear optical material used herein can be within the bead and be efficiently energized, including being energized sufficiently for 2-photon reactions.

Especially with phosphors and other non-linear optical material embodiments, the phosphors and other non-linear optical material can be in the bead, coated on the bead, generally under the outer layer, and/or in the binder.

Especially in near field applications, e.g. less than 5 feet, retro-reflectors with internal phosphors and other non-linear optical material can be used with visible light as well. Being covert is not always advantageous is such applications, and being overt may be advantageous in some. The interrogating light in such applications can be IR, visible, and/or UV and the detected light can also be IR, visible, and/or UV light. Thus in some embodiments, the interrogating light can be IR or visible, and the detected light be visible. With stripes of beads, shining interrogating light on an area of one color could make the area appear to have striping with a different color and detected without special equipment.

Nonlinear optical materials can be organic and inorganic materials. The inorganic materials can be single crystal or polled solid solution materials; including but not limited to: KTP, RTP, LBO, BBO, periodically poled LiNbO3, stoichiometric LiTaO3, and KTP, PLZT, PZT, KTN; and phosphors BaMgAl10O17:Eu2+ (BAM), Y2O3:Eu, and ZnS-based phosphors such as ZnS:Mn.

Nonlinear organic materials can also include organic phosphors (see U.S. Pat. No. 3,867,302 ORGANIC PHOSPHORS AND PROCESS FOR PRODUCTION THEREOF by Takano et al, and 5,100,580 PHOSPHORESCENT MATERIALS by Powell, et al); or Liquid Crystal materials.

Liquid-crystal polymers (LCPs) are a class of aromatic polyester polymers. A unique class of partially crystalline aromatic polyesters based on p-hydroxybenzoic acid and related monomers, liquid-crystal polymers are capable of forming regions of highly ordered structure while in the liquid phase. However, the degree of order is somewhat less than that of a regular solid crystal. Typically LCPs have a high mechanical strength at high temperatures, extreme chemical resistance, inherent flame retardancy, and good weatherability. Liquid-crystal polymers come in a variety of forms from sinterable high temperature to injection moldable compounds. LCP can be welded, though the lines created by welding are a weak point in the resulting product. LCP has a high Z-axis coefficient of thermal expansion.

LCPs are exceptionally inert. They resist stress cracking in the presence of most chemicals at elevated temperatures, including aromatic or halogenated hydrocarbons, strong acids, bases, ketones, and other aggressive industrial substances. Hydrolytic stability in boiling water is excellent. Environments that deteriorate the polymers are high-temperature steam, concentrated sulfuric acid, and boiling caustic materials.

Making an object strongly retro-reflect non-visible light can uses non-visible, e.g. infrared, light from a distance. It can use highly reflective passive non-visible light retroreflectors on the object to reflect and refract light back toward the light transmitter, with the refracted-back light being very nearly parallel to the light from a narrow beam light transmitter.

As an anti-counterfeiting tool, a mixture of different types of beads can be used; types include: Interrogatible by IR, UV, or both (covert material can be coated on, or put in the beads, and can keep not only visible light from retro-reflecting, but either IR or UV, as well); Half-reflective coated (retro-reflections from half-reflective coated bead can be much brighter); Reflective of the interrogating wavelength or at least one modified wavelength (e.g. from nonlinear materials such as phosphors).

Beads can be made with different reflection properties. Modified tags can be routinely introduced, e.g. ever 9 to 12 months, to minimize counterfeiting of tags; or even sooner if counterfeiting is detected.

High value cargo can be marked with special beads, including phosphor-containing and/or other non-linear optical material beads. A number of different phosphors and/or other non-linear optical materials can be used in a very large number of combinations.

In some embodiments, the covert bead retroreflectors have hemispherical reflective coatings. Interrogation of beads may be performed using a coherent laser light source (e.g. eye-safe 1,550 nm). Interrogation of beads may be performed using low power, e.g. <0.5 W for shorter range finder source e for near field detection. A higher power, e.g. 5 W, laser source can be used for far field, long range detection.

Low divergence angle of retro-reflection minimizes detection of reflections by others, such as hijackers; such detection is also minimized by the use of non-visible light.

Existing laser imaging arrays and eye glasses can be used for detection of the non-visible light, as contrasted with the beads used commercially in the visible region.

As used herein, a "label" can have an address, a barcode, or be at least a portion of a security seal.

As used herein, a covert bead means a bead that generally retro-reflects at least one of IR or UV light while generally avoids retro-reflecting of visible light. As used herein, "IR/UV" means at least one of IR or UV light. As used herein, "half-reflective" means that a reflective coating covers from about 25% to about 50% of the surface, e.g. the bottom half of a bead. As used herein, "retro-reflective" means retro-reflective of IR/UV light and/or of light from a phosphor activated by IR/UV light unless otherwise some embodiments indicated. As used herein, the terms "IR detectable" or "UV detectable" mean a usable signal can be produced when interrogated by IR or UV light.

Beads can be used over at least of a portion of a label and/or a security seal, and/or at least a portion of the container. In some embodiments, tape used to seal boxes can be use as a security seal. The label can be a barcode.

Detect tampering can be detect using these beads to determine, e.g., if a container has been redirected, and/or if something has been removed and/or inserted in the container.

If missing containers are found later in some other location, beads can provide evidence that the containers had been stolen. Tagging on six faces of a box can make the stolen box easier to find.

The bead content of liquid paint before being painted, as compared to the normal bead content in commercially used reflectorized paint, can be varied from relatively low, up to commercially used content. Use of varying content can make counterfeiting more difficult, as, e.g., matching the bead density on a counterfeit security seal to the bead density on the original container is not easy.

Beads may be applied through one or more stencils to give the beads a distinctive pattern.

The non-visible light used in interrogating the bead may be UV and/or IR. Infra red is preferred for many embodiments. Ultraviolet can be used to allow the use of a large number of narrow-band-emitting phosphors, whose retro-reflections can be distinguished from one another.

Co-filed applications TIA-1 and TIA-2 are hereby incorporated by reference herein. Although the present invention and its advantages have been described above, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification, but only by the claims.

What is claimed is:

1. A method of remotely interrogating an object, comprising:
   illuminating said object from said remote location with a non-visible light having a predetermined wavelength band;
   sensing of at least a part of said non-visible light from said object, wherein said sensing is at said remote location; and
   analyzing said predetermined wavelength band to determine if said object has a passive non-visible light retro-reflector on its surface, wherein said determining is at said remote location and said passive non-visible light retro-reflector comprises one or more spheres having an inner portion that is at least partially transparent to said non-visible light and an outer layer of material over said inner portion that substantially scatters or absorbs a visible light and at least partially transmits said non-visible light.

2. The method of claim 1, wherein said non-visible light is infrared.

3. The method of claim 2, wherein said non-visible light is eye-safe.

4. The method of claim 1, wherein said outer layer of material comprises chalcogenide glass, silicon, tellurium-containing glass, or selenium-containing glass.

5. The method of claim 1, wherein said sphere comprises a bead.

6. The method of claim 1, wherein said passive non-visible light retro-reflector is amorphous.

7. The method of claim 1, wherein said passive non-visible light retro-reflector is less than 1 mm in diameter.

8. The method of claim 1, wherein said passive non-visible light retro-reflector is less than 50 microns in diameter.

9. The method of claim 1, wherein said passive non-visible light retro-reflector is less than 10 microns in diameter.

10. The method of claim 1, wherein said passive non-visible light retro-reflector has a visible-light absorbing coating.

11. The method of claim 1, wherein said passive non-visible light retro-reflector has a hemispherical reflective coating.

12. The method of claim 1, wherein said passive non-visible light retro-reflector contains a phosphor.

13. The method of claim 1, wherein said passive non-visible light retro-reflector is between 3 and 10 microns in diameter.

14. The method of claim 1, wherein said one or more spheres comprise a mixture of at least three types of beads, wherein said types of beads are selected from interrogatible by IR, interrogatible by UV, interrogatible by both IR and UV, half-reflective coated, reflective of said predetermined wavelength band, and reflective of at least one modified wavelength.

15. The method of claim 1, wherein said inner portion contains a nonlinear optical material.

16. The method of claim 1, wherein said passive non-visible light retro-reflector comprises a pattern of said spheres on said object.

17. The method of claim 16, wherein said pattern comprises a design or a barcode.

18. The method of claim 1, wherein said passive non-visible light retro-reflector comprises a ink, a paint, a tape, a label, a tag or a security seal.

19. A method of remotely interrogating at least two objects with non-visible light from a remote location, comprising:
   a. illuminating said at least two objects with a non-visible light from the remote location;
   b. sensing at least a part of said non-visible light emanating from said objects at said remote location; and
   c. analyzing said non-visible light emanating from said objects to determine if any of said non-visible light has been reflected by a passive non-visible light retro-reflector, whereby objects having said passive non-visible light retro-reflectors can be distinguished from objects not having said passive non-visible light retro-reflectors, and each said passive non-visible light retro-reflector comprises one or more spheres having an inner portion that is at least partially transparent to said non-visible light and an outer layer of material over said inner portion that substantially scatters or absorbs a visible light and at least partially transmits said non-visible light.

20. A method of determining from a remote location if an object has a passive non-visible light retro-reflector on its surface, comprising:
   illuminating said object with a non-visible light having a predetermined wavelength from a remote location; and
   sensing at said remote location for said non-visible light of said predetermined wavelength, whereby said object can be distinguished from said object having said passive non-visible light retro-reflector and said object that does not have said passive non-visible light retro-reflector, and each said passive non-visible light retro-reflector comprises one or more spheres having an inner portion that is at least partially transparent to said non-visible light and an outer layer of material over said inner portion that substantially scatters or absorbs a visible light and at least partially transmits said non-visible light.

* * * * *